United States Patent
Mendel

(10) Patent No.: US 12,316,743 B2
(45) Date of Patent: May 27, 2025

(54) DATA PROCESSING DEVICE AND METHOD FOR THE CRYPTOGRAPHIC PROCESSING OF DATA

(71) Applicant: Infineon Technologies AG, Neubiberg (DE)

(72) Inventor: Florian Mendel, Munich (DE)

(73) Assignee: Infineon Technologies AG, Neubiberg (DE)

( * ) Notice: Subject to any disclaimer, the term of this patent is extended or adjusted under 35 U.S.C. 154(b) by 622 days.

(21) Appl. No.: 17/351,821

(22) Filed: Jun. 18, 2021

(65) Prior Publication Data

US 2022/0137929 A1     May 5, 2022

(30) Foreign Application Priority Data

Nov. 4, 2020   (DE) .......................... 102020129058.6

(51) Int. Cl.
| | |
|---|---|
| H04L 9/00 | (2022.01) |
| H04L 9/06 | (2006.01) |
| H04L 9/08 | (2006.01) |

(52) U.S. Cl.
CPC .......... *H04L 9/0631* (2013.01); *H04L 9/0816* (2013.01)

(58) Field of Classification Search
CPC ...... H04L 9/0631; H04L 9/0816; G06F 21/75
See application file for complete search history.

(56) References Cited

U.S. PATENT DOCUMENTS

| | | | |
|---|---|---|---|
| 2014/0003603 A1* | 1/2014 | Shibutani | G09C 1/00 380/46 |
| 2015/0169467 A1* | 6/2015 | Chase | G06F 16/9014 711/216 |

OTHER PUBLICATIONS

"Algebraic normal form", Oct. 16, 2020, 1-5.
Schneier, Bruce, et al., "Twofish: A 128-Bit Block Cipher", Jun. 15, 1998, 1-68.
Stoianov, Nikolai, "One Approach of Using Key-Dependent S-BOXes in AES", Jun. 2-3, 2011, 317-323.

* cited by examiner

*Primary Examiner* — Syed M Ahsan
(74) *Attorney, Agent, or Firm* — Murphy, Bilak & Homiller, PLLC

(57) ABSTRACT

According to one example embodiment, a data processing device is described, having a processing circuit which processes a data block cryptographically iteratively, starting from the received version of the data block, via a plurality of processed versions of the data block through to an output version of the data block in a plurality of successive rounds by means of an S-box. The S-box has a plurality of layers, in each case having a majority gate and an Exclusive-OR gate.

8 Claims, 15 Drawing Sheets

DATA PROCESSING DEVICE AND METHOD FOR THE CRYPTOGRAPHIC PROCESSING OF DATA

TECHNICAL FIELD

Example embodiments generally relate to data processing devices and methods for the cryptographic processing of data.

BACKGROUND

In security-related applications, computer chips such as, for example, on a chip card or in a control device in a vehicle, typically perform cryptographic operations for encryption, decryption and authentication. One class of cryptographic methods contains "S-boxes" as basic components. An S-box performs a substitution operation in which an n-digit binary number is replaced with an m-digit binary number. They are used, for example, in block encryption methods, typically iteratively in a plurality of rounds, to blur the relationship between clear text and ciphertext. Examples of cryptographic methods which use S-boxes are the DES (Data Encryption Standard) and the AES (Advanced Encryption Standard). Efficient implementations of S-boxes that guarantee high security are desirable.

A Wikipedia article on the "ring sum normal form" dated 16 Oct. 2020 discloses that the Exclusive OR and conjunction form a complete basis for the Boolean functions.

A publication entitled "Twofish: A 128-Bit Block Cipher" by Schneier, B. et al., 15 Jun. 1998, describes a block encryption method in which a variant of the encryption method can be defined by means of a key.

A publication entitled "One Approach of Using Key-Dependent S-BOXes in AES" by Stoianov, N., in Multimedia Communications, Services and Security—4th International Conference (MCSS 2011), Krakow, Poland, Jun. 2-3, 2011, pp. 317-323, describes key-dependent S-boxes.

SUMMARY

According to one embodiment, a data processing device is provided, having a data input to receive a data block to be cryptographically processed and a processing circuit having a control input to receive a set of control parameter bit values depending on which the data block is to be processed. The processing device is configured to cryptographically process the data block, iteratively, starting from the received version of the data block, via a plurality of processed versions of the data block through to an output version of the data block in a plurality of successive rounds, where the processing circuit implements at least one S-box and, in each round, processes data words of the version of the data block which is to be processed in the round by means of the S-box. The S-box has a plurality of successive layers, where each layer has: a majority gate having at least two inputs that, in each case, are inverting or non-inverting, said majority gate combining the at least one bit of the data word to be processed by the S-box and/or at least one output bit of a preceding layer of the S-box with at least one of the control parameter bit values, where the majority gate is a hardwired hardware circuit or a reconfigurable hardware circuit configured to implement a majority gate; and an Exclusive-OR gate (also referred to as an XOR gate) having at least two inputs that, in each case, are inverting or non-inverting, said Exclusive-OR gate combining the output bit of the majority gate of the layer with a bit of the data word to be processed by the S-box or with an output bit of the preceding layer of the S-box, where the Exclusive-OR gate is a hardwired hardware circuit or a reconfigurable hardware circuit configured to implement an Exclusive-OR gate. The data word processed by the S-box results from output bits of the layers.

According to a further embodiment, a method is provided for the cryptographic processing of data corresponding to the data processing device described above.

BRIEF DESCRIPTION OF THE FIGURES

The figures do not reflect the actual size ratios, but are intended to serve to illustrate the principles of the different example embodiments. Different example embodiments are described below with reference to the following figures.

DETAILED DESCRIPTION

The following detailed description relates to the attached figures which show details and example embodiments. These example embodiments are described in such detail that the person skilled in the art can implement the invention. Other embodiments are also possible and the example embodiments can be modified in structural, logical and electrical terms without deviating from the subject-matter of the invention. The different example embodiments are not necessarily mutually exclusive, but rather different embodiments can be combined with one another to produce new embodiments. In the context of this description, the terms "linked," "connected" and "coupled" are used to describe both a direct and an indirect link, a direct or indirect connection, and a direct or indirect coupling.

Figure 1:
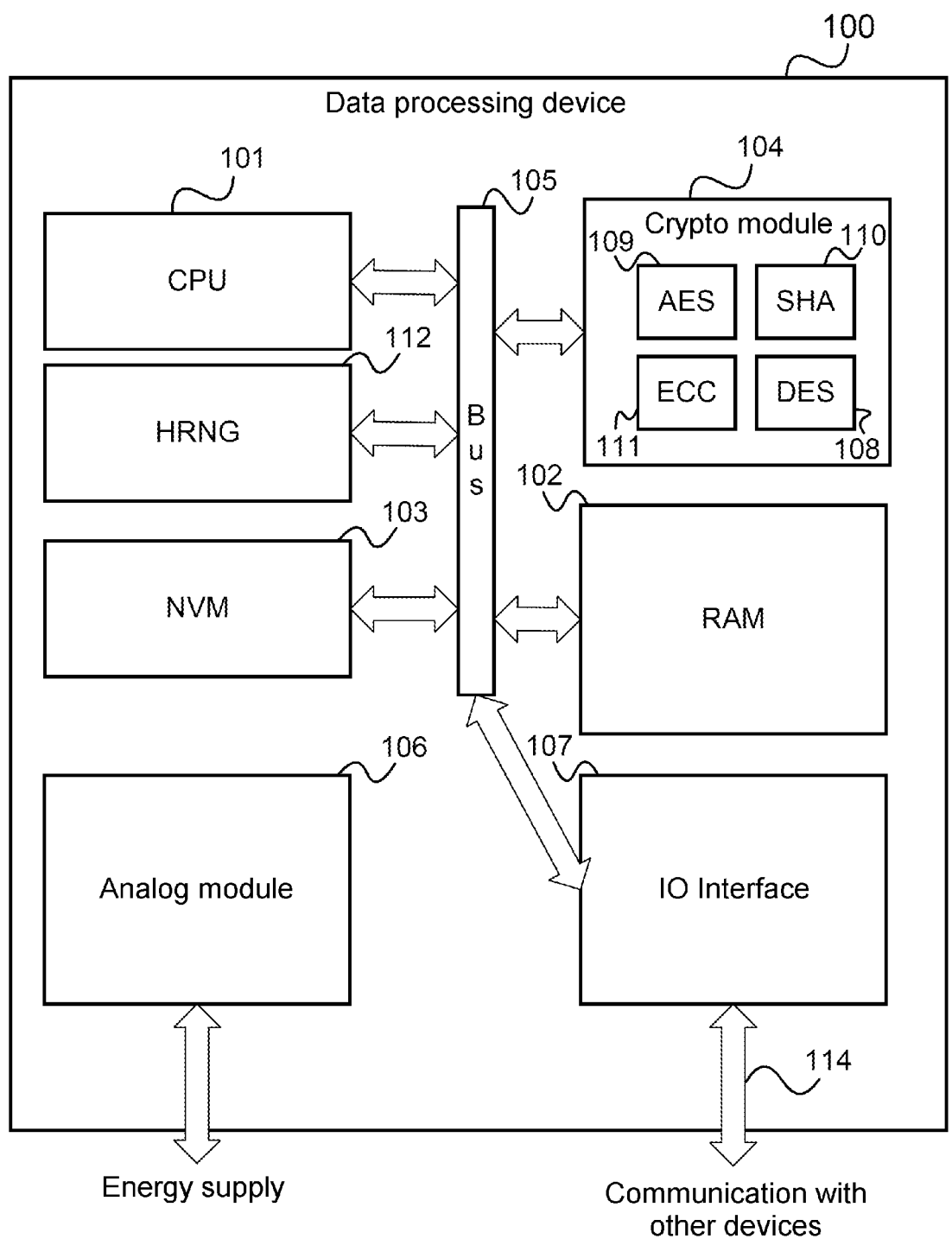
FIG. 1 shows an example of a data processing device for performing cryptographic operations.

FIG. 1 shows an example of a data processing device 100 having a CPU 101, a RAM (Random Access Memory) 102, a non-volatile memory (NVM) 103, a crypto module 104, an analog module 106, an input/output interface 107 and a hardware random number generator (HRNG) 112.

In this example, the CPU 101 has access to at least one crypto module 104 via a common bus 105 to which each crypto module 104 is connected. Each crypto module 104 can, in particular, comprise one or more crypto cores in order to perform specific cryptographic operations. Examples of crypto cores are:

a DES core 108,
an AES core 109,
an SHA (Secure Hash Algorithm) core 110, and
an ECC (Error Checking and Correction) core 111.

The CPU 101, the hardware random number generator 112, the NVM 103, the crypto module 104, the RAM 102 and the input/output interface 107 are connected to the bus 105. The input/output interface 107 can have a connection 114 to other devices similar to the data processing device 100.

The analog module 106 is supplied with electrical energy from a power supply via an electrical contact and/or via an electromagnetic field. This energy is provided in order to supply the data processing device 100 and can, in particular, enable the input/output interface to initiate and/or maintain connections to other devices via the connection 114.

The bus 105 itself can be masked or simple. Instructions to execute the processing and the algorithms which are described below can be stored, in particular, in the NVM 103 and can be processed by the CPU 101. The process data can be stored in the NVM 103 or in the RAM 102. Random numbers are supplied by the hardware random number generator 112.

The processing and the algorithms described below can be executed exclusively or at least partially on the crypto module 104. A crypto module 104 can be equipped with hardware-based security mechanisms. Such hardware-based security mechanisms can be circuits which implement countermeasures against side-channel performance analysis or fault injection (e.g., using a laser). Such countermeasures could be implemented using randomization, redundant hardware or redundant processing. Generally speaking, the aim of countermeasures is to conceal the internally processed values and interim results from an attacker who is able to observe the physical effect of the processing of such values.

The components of the data processing device 100 can be implemented, for example, on a single chip. The data processing device 100 can be a chip card (or chip card module) that is supplied by means of direct electrical contact or by means of an electromagnetic field. The data processing device 100 can be a fixed circuit or can be based on reconfigurable hardware (e.g., Field Programmable Gate Array, FPGA). The data processing device 100 can be connected to a personal computer, microcontroller, FPGA or a smartphone system on chip (SoC) or other components of a smartphone. The data processing device 100 can be a chip that acts as a Trusted Platform Module (TPM) and provides cryptographic functionality according to a standardized interface to a computer, smartphone, Internet of Things (IoT) device or vehicle.

The crypto module 104 can use S-boxes for specific cryptographic methods. Examples of such cryptographic methods are DES (Data Encryption Standard) and AES (Advanced Encryption Standard).

Figure 2:
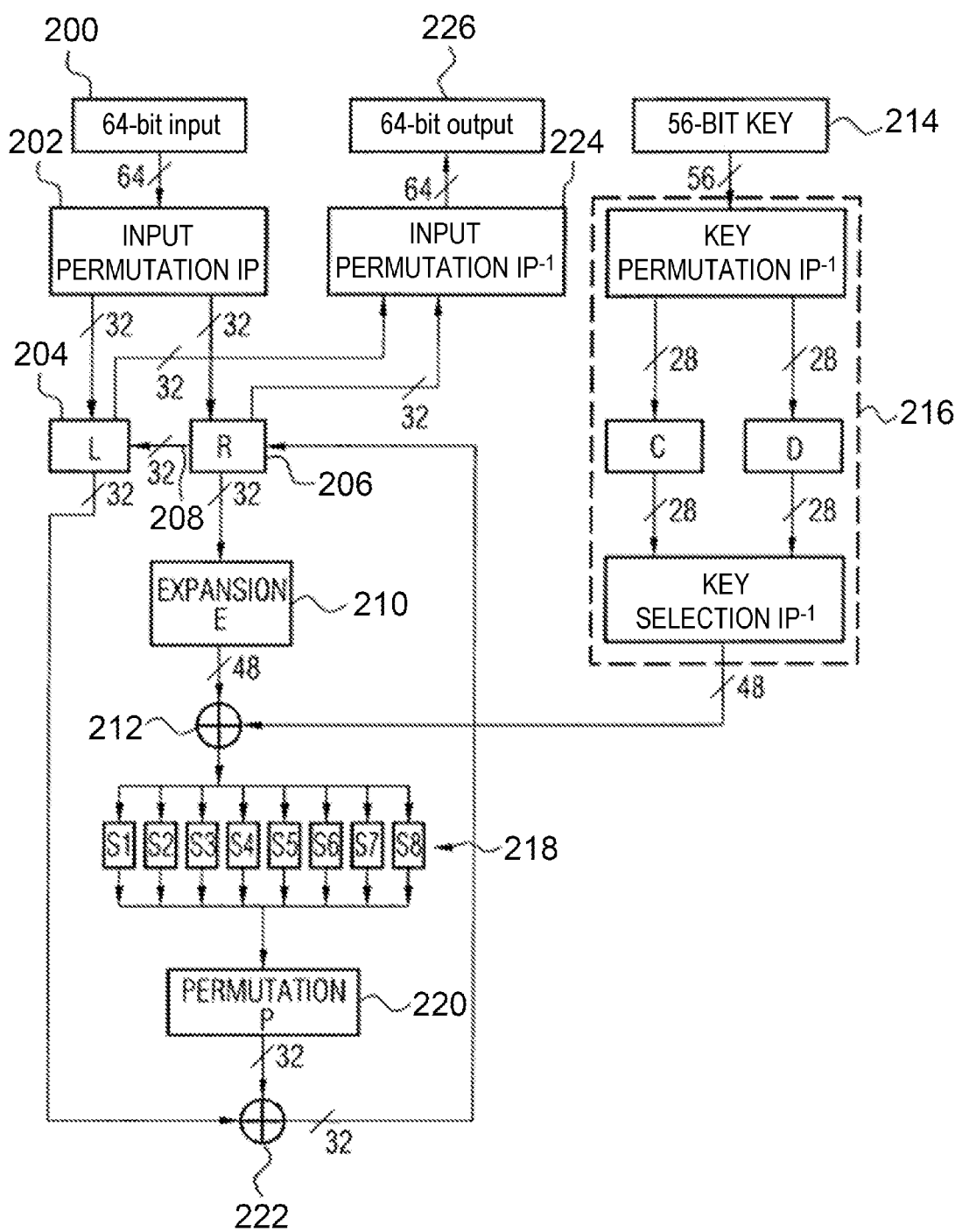
FIG. 2 shows schematically the mode of operation of the DES (Data Encryption Standard).

FIG. 2 shows schematically the mode of operation of the DES. For the encryption of data, these data are first divided into 64-bit blocks 200 in order to process them block-by-block. The blocks 200 are then first subjected to a permutation 202. The permutated 64-bit data block is then divided into two 32-bit data blocks 204 and 206. These 32-bit blocks 204 and 206 are subjected iteratively in 16 rounds to the following operations. The content of the data block 206, which is denoted R in FIG. 2, is first mapped onto the data block 204 of the next round, which is denoted L in FIG. 2. This mapping is indicated by the arrow 208. In order to obtain the new content of the data block R 206 for the next round, the current content of the data block 206 is subjected to an expansion operation E 210 in order to obtain a 48-bit data block from the 32-bit data block on the basis of a predefined expansion rule according to which specific bits are doubled. Said 48-bit data block is then encrypted by means of an XOR linking 212 with a 48-bit round key which is different for each round, but which is derived from one and the same 56-bit key 214 by means of an operation 216 not explained in detail here.

The encrypted and expanded 48-bit data block is again mapped onto a 32-bit data block in the aforementioned S-boxes S1-S8. For this purpose, each S-box in each case maps six different bits of the 48 bits of the encrypted data block onto four bits, wherein the mapping rules of the individual S-boxes are usually defined by standards. Following this S-box mapping 218, the resulting value is again subjected to a permutation P 220 and the permutated 32-bit block is then subjected to an XOR linking with the 32-bit data block L 204 of the preceding round. The XOR-linked 32-bit data block represents the new 32-bit data block R 206 for the next round. This round defined by 208, 210, 212, 218, 220 and 222 is performed 16 times. After the 16 rounds, the resulting 32-bit data blocks L and R (204, 206) are again combined into a 64-bit data block and are subjected to an output permutation 224 which is the inverse of the permutation 202, as a result of which the 64-bit output data block 226 is obtained in encrypted form.

Figure 3:
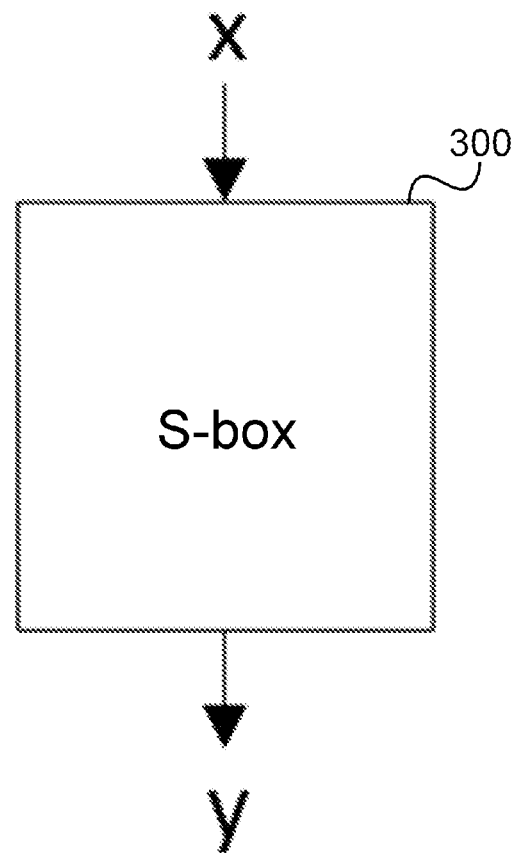
FIG. 3 shows an illustration of an S-box.

In general terms, the S-boxes represent any, not necessarily unique, mapping of an n-bit vector onto an m-bit vector. The mappings are non-linear in most cryptographic algorithms. Although S-boxes which map a 6-bit vector onto a 4-bit vector are used in the example shown in FIG. 2, other values for n and m can also be used according to different example embodiment. In the examples below, 4-bit S-boxes are described in which n=m=4. However, S-boxes can similarly also be implemented for other values of n and m, depending on the crypto method and the data block size for which they are used FIG. 3 shows an illustration of an S-box 300.

The S-box 300 effects a mapping S of a data word X (consisting of a plurality of input bits) onto a processed data word Y. The data word X is also referred to as an input word or input value and the processed data word Y is also referred to as an output word or output value.

According to different embodiments, a parameterized S-box is provided.

Figure 4:
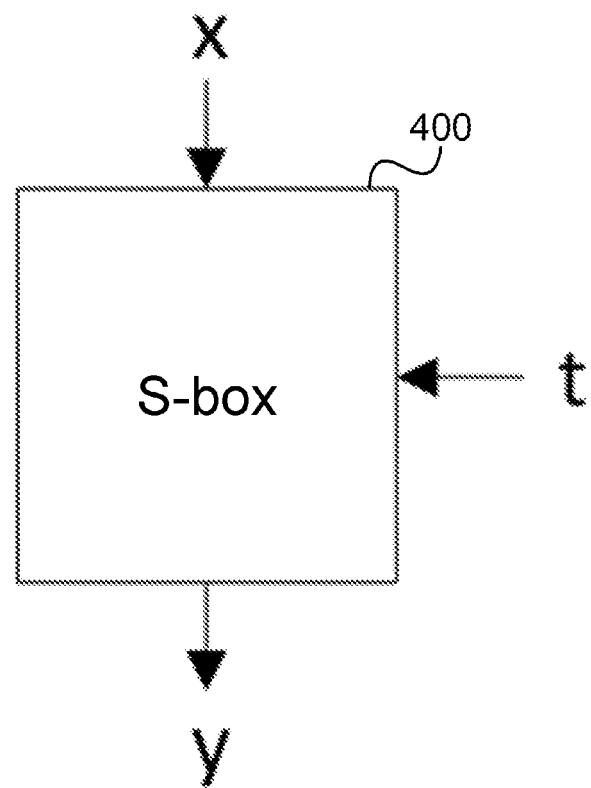
FIG. 4 shows an illustration of a parameterized S-box.

FIG. 4 shows an illustration of a parameterized S-box 400.

The parameterized S-box effects a mapping S(·) of a data word X (consisting of a plurality of input bits) onto a processed data word Y. However, the mapping further depends on a control word t, i.e., a set of control parameter bit values.

The parameterized S-box 400 is thereby implemented in such a way that a modification of the control word t results in a different mapping S(.,t), i.e. the mapping S(.,t) of X onto Y depends on t.

The use of parameterized S-boxes 400 in a cryptographic method, e.g., in the crypto module 104 for one of the crypto cores 108 to 111, enables:

product diversification: the control word can be stored in a chip as read-only, e.g., by means of a plurality of TIE cells (i.e., cells in each case having two field effect transistors which keep themselves mutually activated). A chip can therefore be produced that (through the choice of a new control word) performs crypto methods that differ from those of the preceding chips without a new chip design or a new circuit synthesis being required.

protection against reverse engineering: the control word can be provided on a chip by a network of camouflage cells in order to implement one of a plurality of variants of a crypto method on the chip and increase the costs of reverse engineering of the chip (in which the variant must be identified).

protection against physical attacks: the control word can be a chip-specific value which is stored in a non-volatile memory; this hinders the reproducibility of an attack on other chips.

It should be noted that the mapping S effected by an S-box can also be effected by adding a linear layer at the input and/or at the output of the S-box, i.e., so that $S = L_1 \circ P \circ L_2$.

The linear layers $L_1$ and $L_2$ are typically either simple bit permutations or the addition of a constant (e.g., defined by TIE cells). Cryptographic properties of the S-box (such as differential probability, linear probability and degree) are not modified by the linear layers. However, the use of linear layers $L_1$ and $L_2$ at the input and output restricts the flexibility of the parameterization of the S-box and incurs high implementation costs.

Conversely, according to different embodiments, the mapping effected by an S-box is therefore changed through modification of the non-linear operation (i.e., P in the above formula), i.e., P depends on the control word. The cryptographic properties of the S-box can depend on the control word or can be independent from the control word.

According to different embodiments, a parameterised S-box is implemented by means of majority gates, denoted MAJ. A majority gate outputs the bit value which the majority of its input bits have.

It should be noted that the following applies:
AND(a,b)=MAJ(a,b,0)
and
OR(a,b)=MAJ(a,b,1).

One example of a 4-bit S-box parameterized by a 4-bit control word $t = t_0 \ldots t_3$ (i.e., having a-four-bit data word (a, b, c, d) to be processed) is provided by p=a;q=b
a=XOR2(c, MAJ(p, q, $t_0$))
b=XOR2(d, MAJ(q, c, $t_1$))
c=XOR2(p, MAJ(a, b, $t_2$))
d=XOR2(q, MAJ(b, c, $t_3$))

where XO is an Exclusive-OR having two inputs (in each case 1 bit).

In this example, all 16 possible control words result in a cryptographically strong S-box. Compared with an unparametrized 4-bit S-box, the parameterised 4-bit S-box can be implemented with relatively low implementation costs (4 XOR2+4 MAJ vs. 4 XOR2+4 NAND).

There are 16 classes of cryptographically strong 4-bit S-boxes, denoted here as C0 to C15, where all S-boxes within one class are affine equivalent but S-boxes of different classes are not affine equivalent (i.e., cannot be generated from one another by linear layers $L_1$ und $L_2$ at the input and/or output). The classes are indicated in the following table, where, for each class for each 4-bit input value (between 0 and 15), the 4-bit output value is indicated onto which it is mapped.

TABLE 1

|     | 0 | 1 | 2 | 3 | 4 | 5 | 6 | 7  | 8 | 9  | 10 | 11 | 12 | 13 | 14 | 15 |
|-----|---|---|---|---|---|---|---|----|---|----|----|----|----|----|----|----|
| C0  | 0 | 1 | 2 | 3 | 4 | 6 | 8 | 12 | 5 | 9  | 13 | 15 | 10 | 7  | 11 | 14 |
| C1  | 0 | 1 | 2 | 3 | 4 | 6 | 8 | 12 | 5 | 9  | 11 | 13 | 14 | 10 | 7  | 15 |
| C2  | 0 | 1 | 2 | 3 | 4 | 6 | 8 | 12 | 5 | 9  | 11 | 13 | 14 | 7  | 10 | 15 |
| C3  | 0 | 1 | 2 | 3 | 4 | 6 | 8 | 11 | 5 | 12 | 13 | 7  | 15 | 9  | 14 | 10 |
| C4  | 0 | 1 | 2 | 3 | 4 | 6 | 8 | 11 | 5 | 12 | 13 | 7  | 10 | 15 | 9  | 14 |
| C5  | 0 | 1 | 2 | 3 | 4 | 6 | 8 | 11 | 5 | 12 | 13 | 7  | 9  | 15 | 10 | 14 |
| C6  | 0 | 1 | 2 | 3 | 4 | 6 | 8 | 11 | 5 | 12 | 9  | 13 | 14 | 10 | 7  | 15 |
| C7  | 0 | 1 | 2 | 3 | 4 | 6 | 8 | 11 | 5 | 12 | 9  | 13 | 14 | 7  | 10 | 15 |
| C8  | 0 | 1 | 2 | 3 | 4 | 6 | 8 | 11 | 5 | 9  | 12 | 15 | 7  | 13 | 10 | 14 |
| C9  | 0 | 1 | 2 | 3 | 4 | 6 | 8 | 11 | 5 | 9  | 12 | 14 | 13 | 10 | 7  | 15 |
| C10 | 0 | 1 | 2 | 3 | 4 | 6 | 8 | 11 | 5 | 9  | 12 | 14 | 13 | 7  | 10 | 15 |
| C11 | 0 | 1 | 2 | 3 | 4 | 6 | 8 | 10 | 5 | 11 | 12 | 15 | 14 | 13 | 9  | 7  |
| C12 | 0 | 1 | 2 | 3 | 4 | 6 | 8 | 10 | 5 | 11 | 12 | 15 | 13 | 14 | 7  | 9  |
| C13 | 0 | 1 | 2 | 3 | 4 | 6 | 8 | 10 | 5 | 11 | 12 | 15 | 7  | 14 | 9  | 13 |
| C14 | 0 | 1 | 2 | 3 | 4 | 6 | 8 | 10 | 5 | 11 | 12 | 15 | 7  | 13 | 9  | 14 |
| C15 | 0 | 1 | 2 | 3 | 4 | 6 | 8 | 10 | 5 | 11 | 12 | 15 | 7  | 9  | 13 | 14 |

FIG. 5 to FIG. 13 show examples 500 to 1300 of 4-bit S-boxes according to embodiments of the invention.

In FIG. 5 to FIG. 13, the bits of the data word are denoted A, B, C and D and are processed by a plurality of layers, in each case having a majority gate and an Exclusive-OR gate, in the representation shown in FIG. 5 to 13 from the top down.

The operation of each layer is indicated by "MAJ [number of the output bit] [number of the first input bit] [number of the second input bit]", wherein the bits A, B, C, and D are numbered as 0, 1, 2, 3. The layers are numbered continuously starting from zero for each S-box and a control bit Ti which combines the majority gate of the layer with the "first input bit" and the "second input bit" is fed to the i-th layer.

Figure 5:
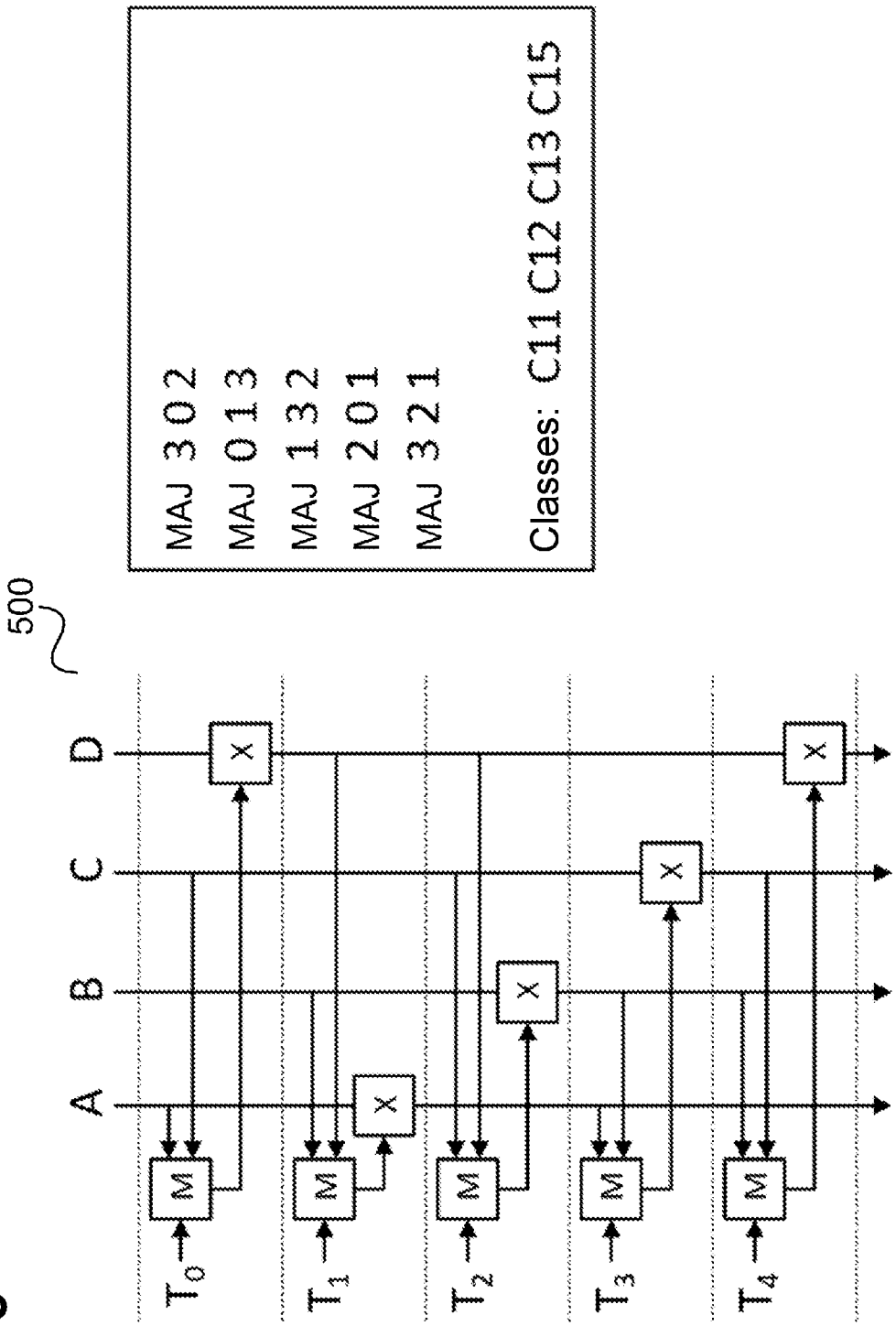
FIG. 5 to FIG. 13 show examples of 4-bit S-boxes according to embodiments of the invention.
Figure 6:
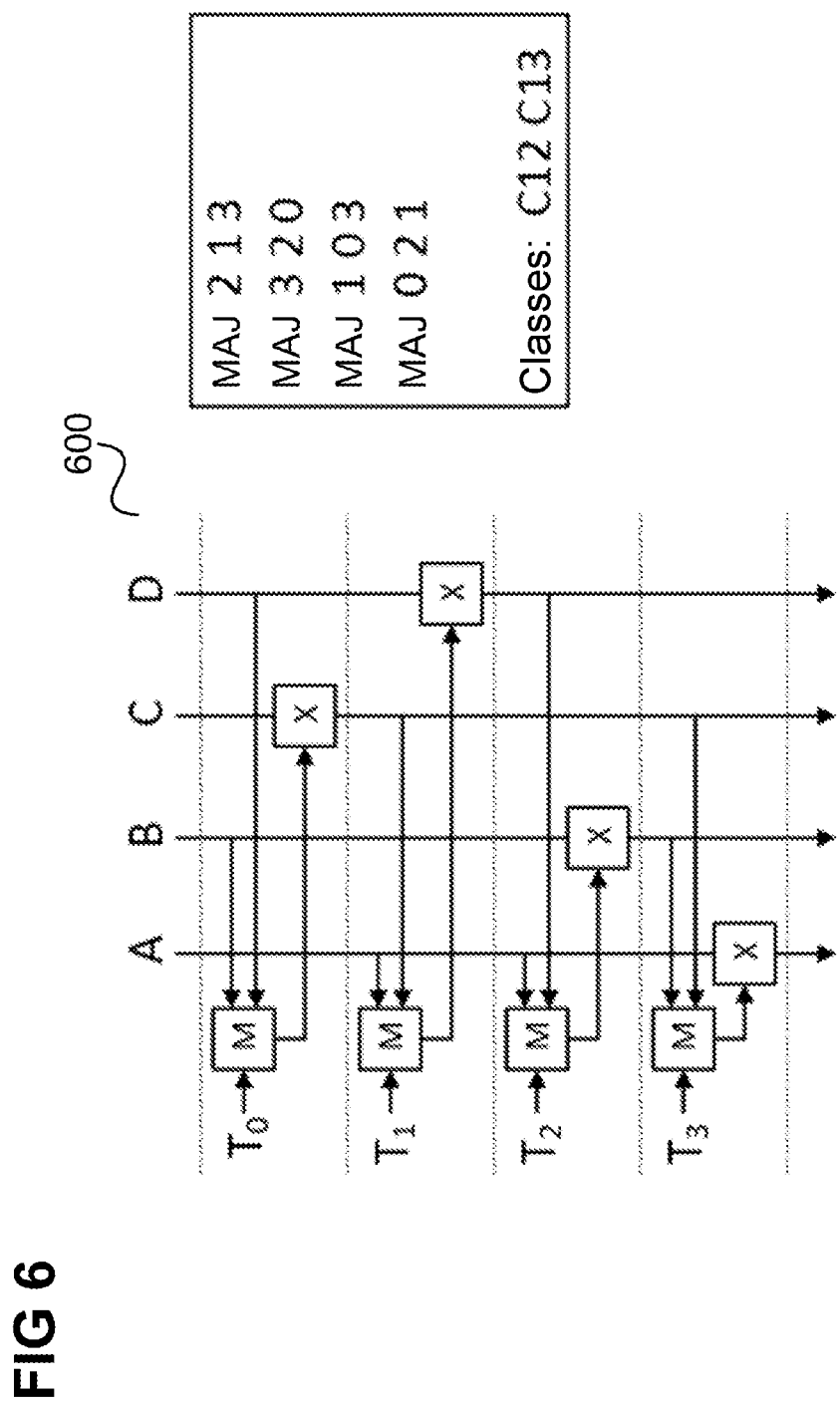
Figure 7:
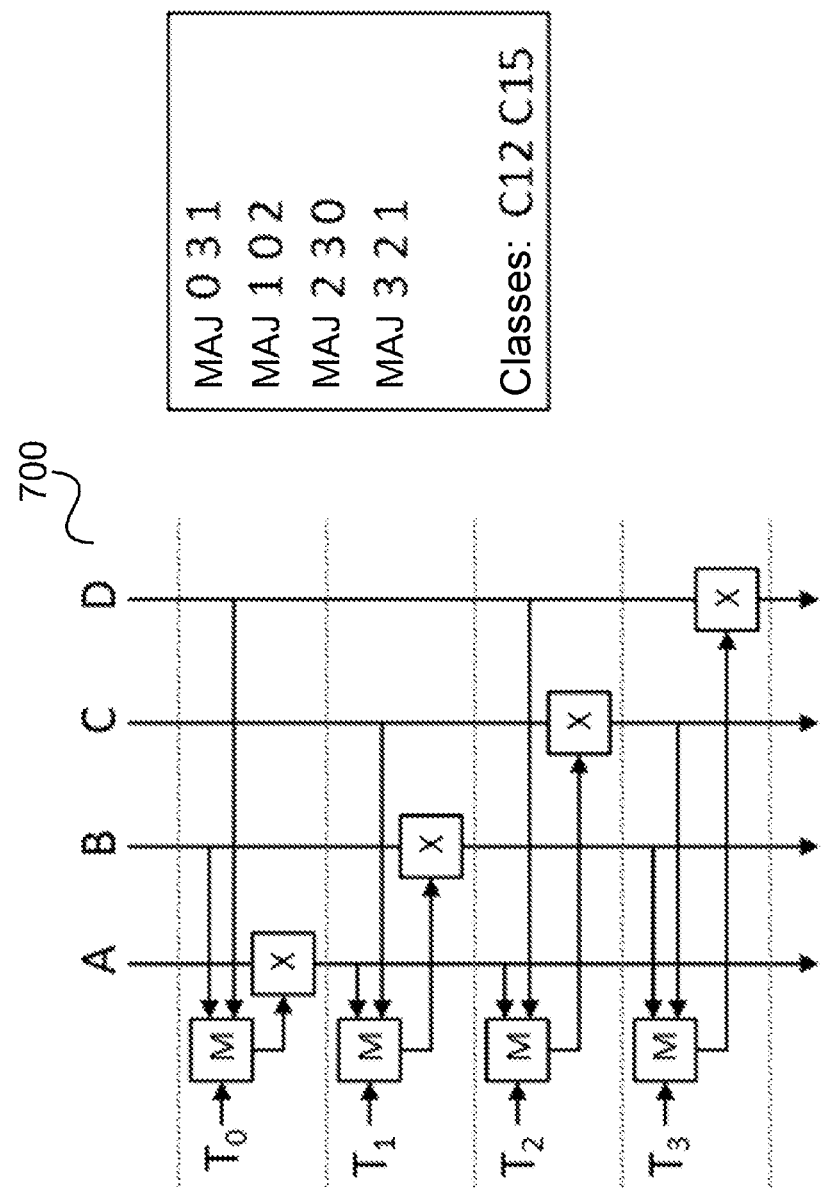
Figure 8:
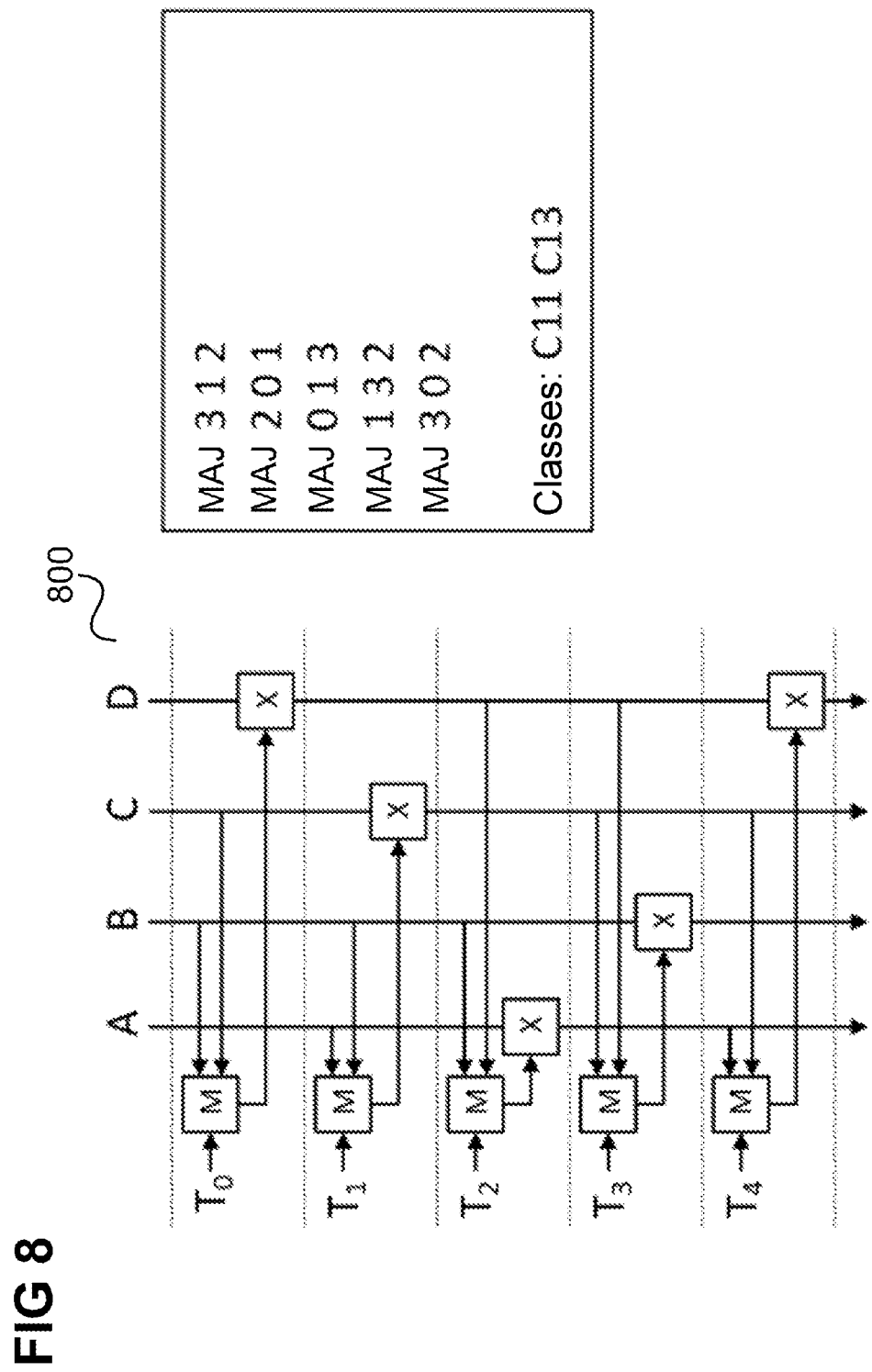
Figure 9:
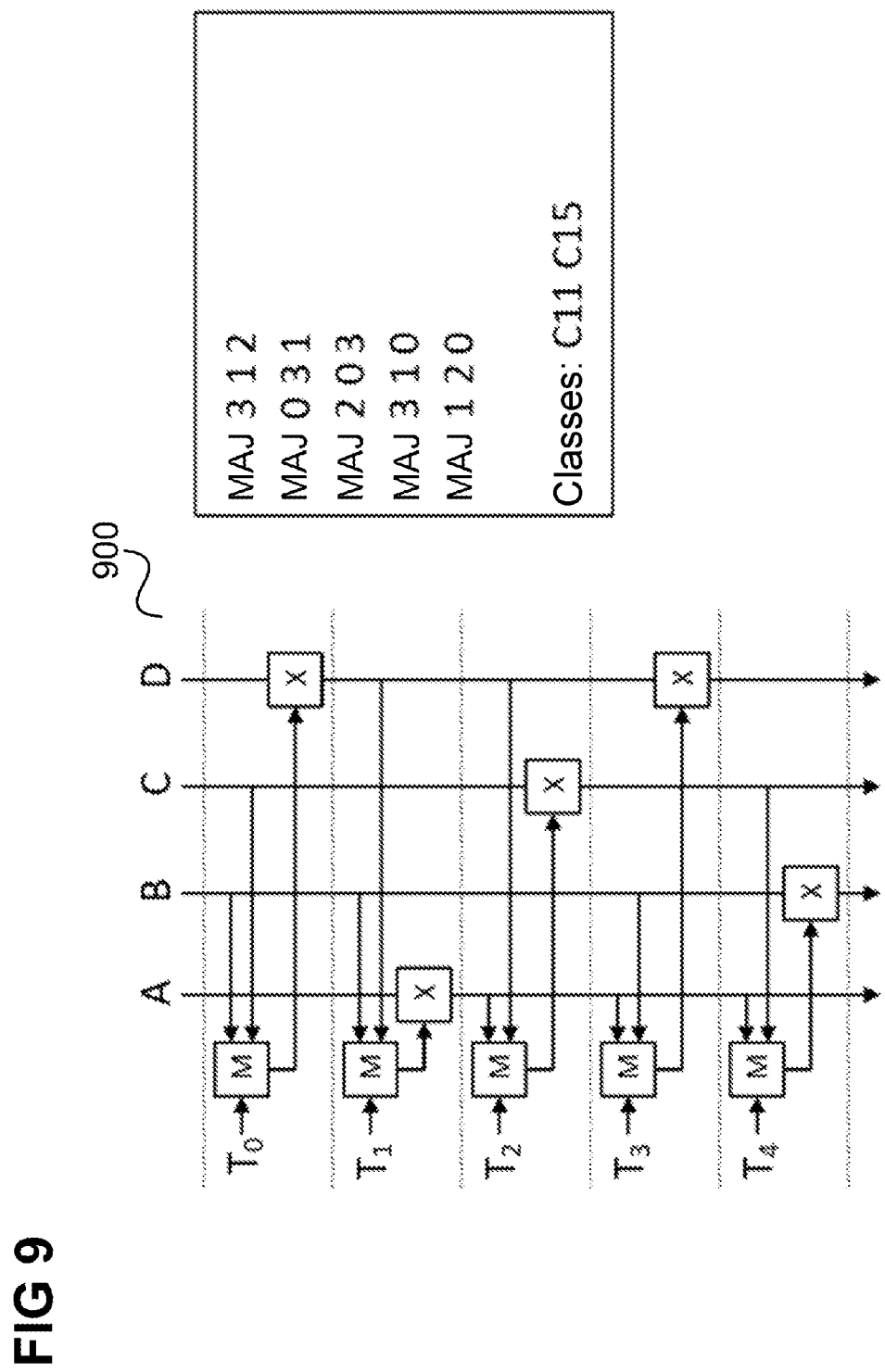
Figure 10:
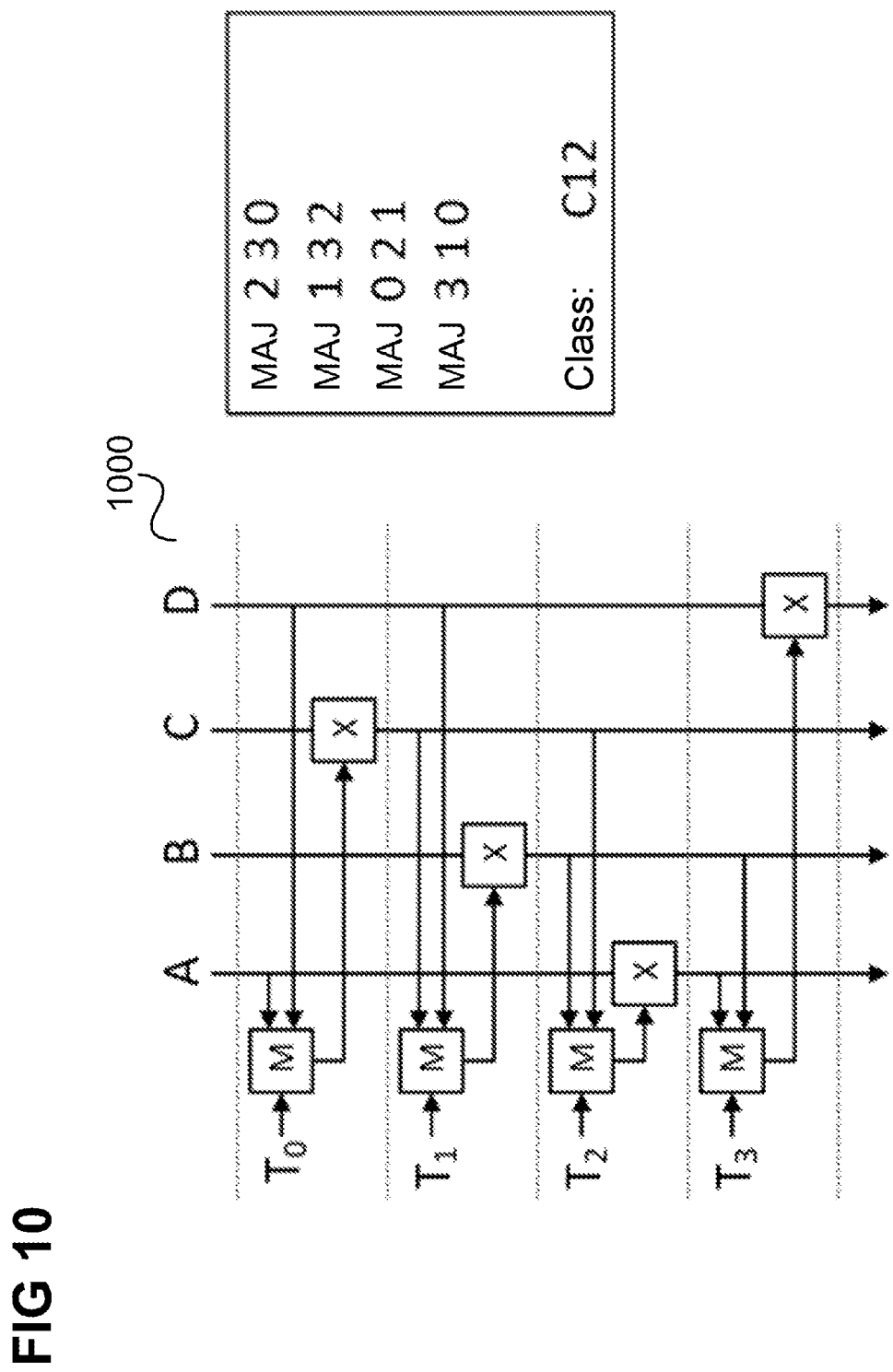
Figure 11:
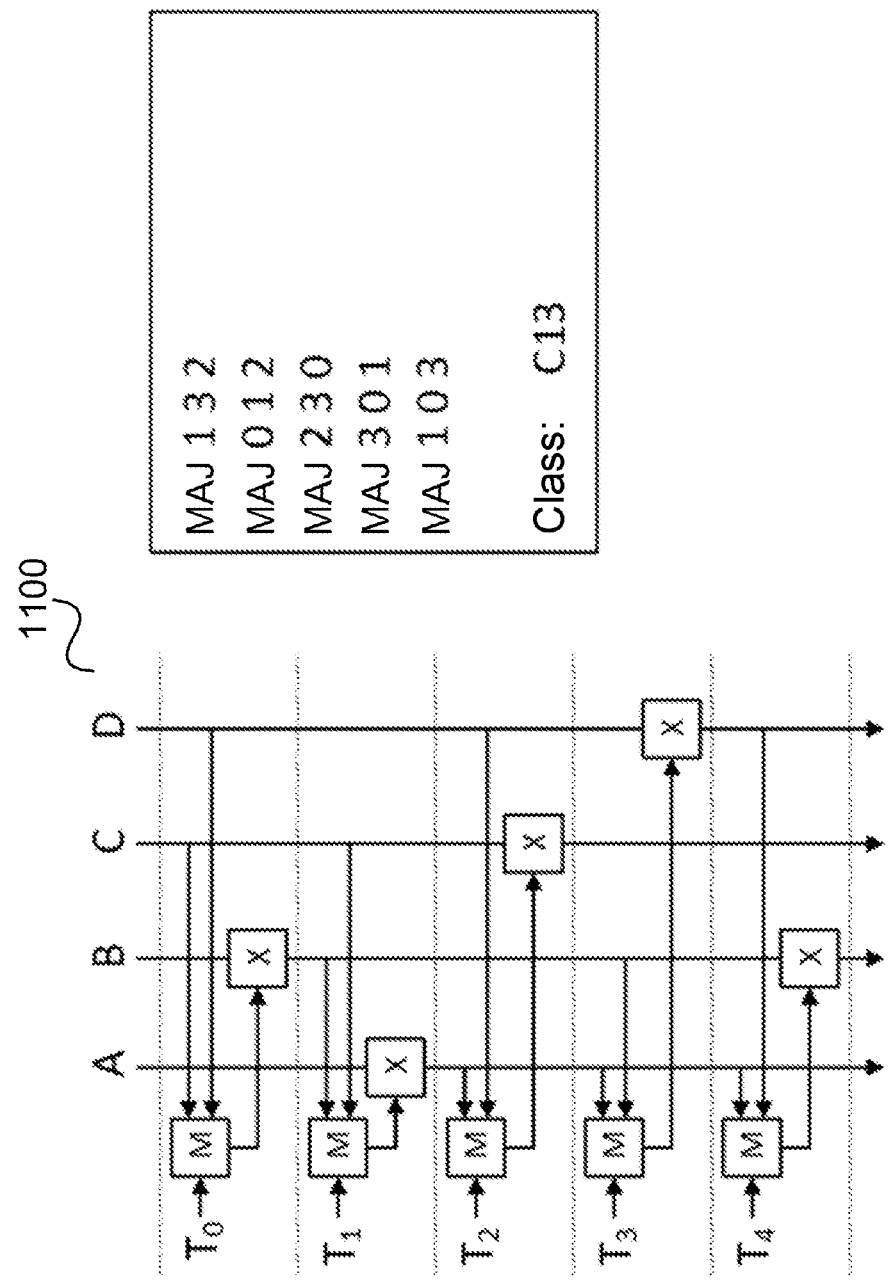
Figure 12:
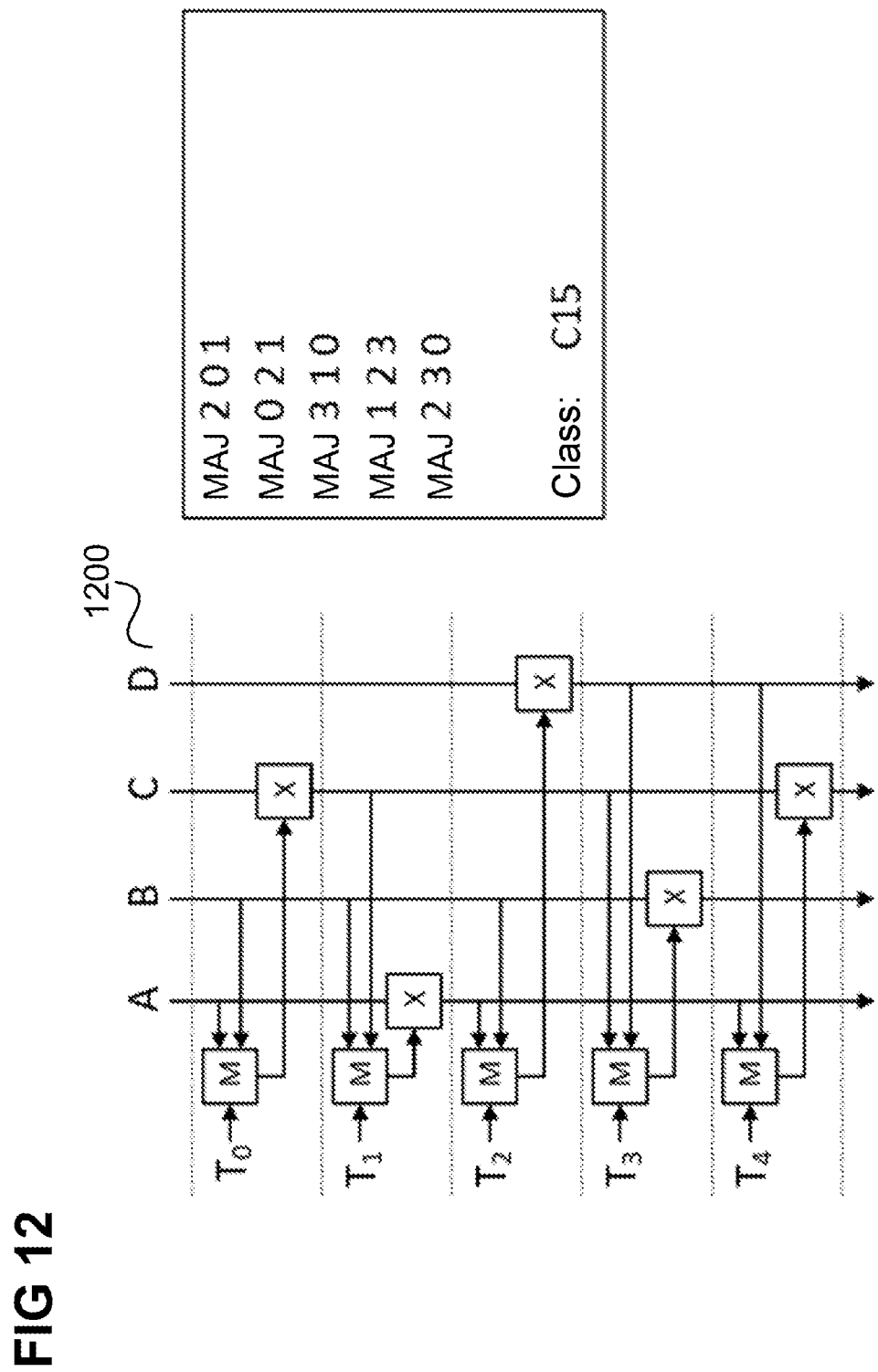
Figure 13:
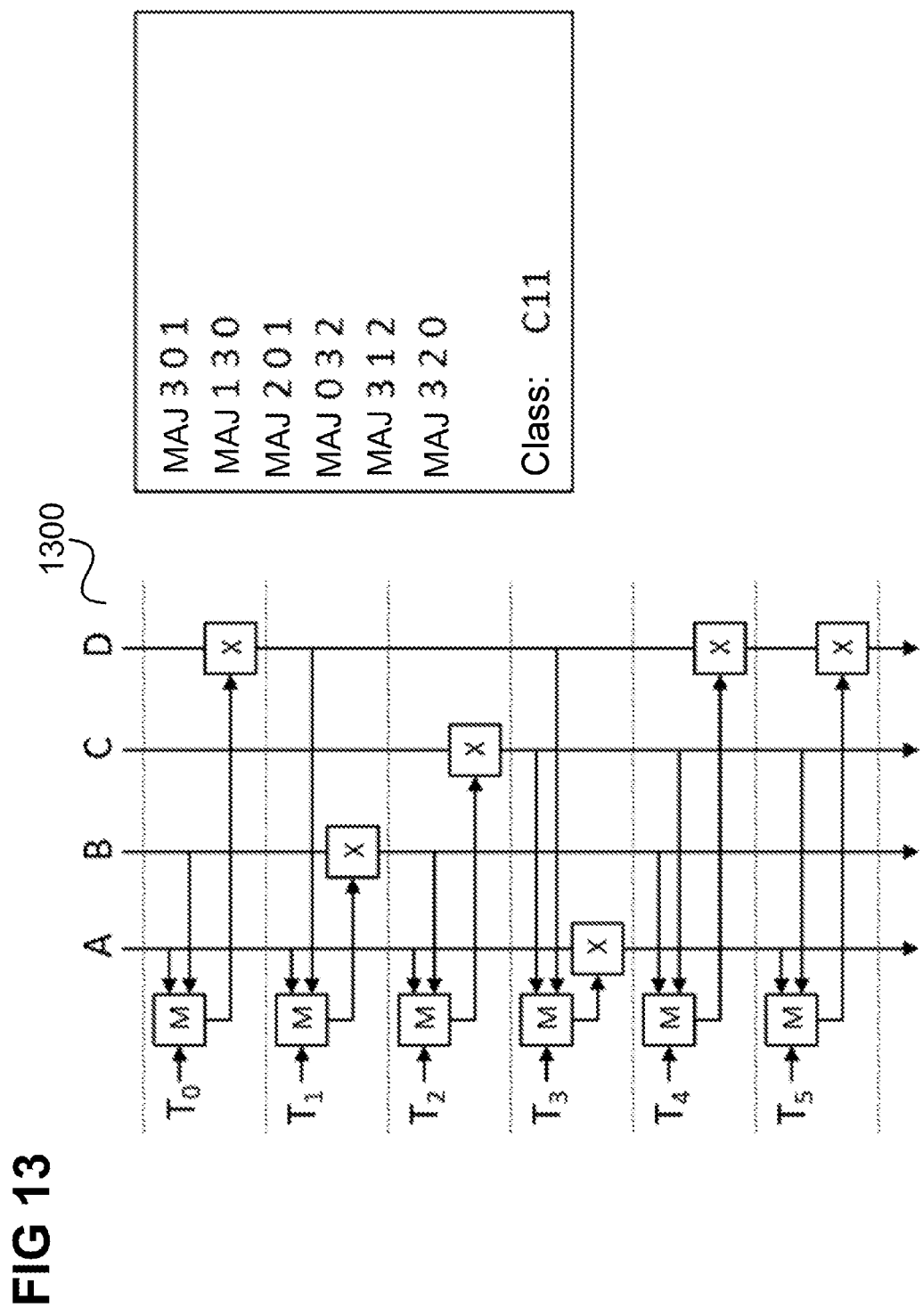

In the example shown in FIG. 5, "MAJ 3 0 2", for example, means that, for the uppermost layer, the processed bit 3 (i.e. bit D) results as an Exclusive-OR combination of the current bit 3 with the output of the majority gate, where the majority gate receives the bit 0 (i.e. A) and the bit 2 (i.e. C) as inputs and combines them with the control bit T0 (as it is the 0-th layer).

The class or classes to which the S-boxes implemented for the different control words belong is/are further indicated for each S-box.

A parameterized S-box can also be masked, e.g., for protection against probing attacks and side-channel attacks, e.g., by using Exclusive-OR gates with more than two inputs whose output depends on more than one masking bit.

In the above example of a 4-bit S-box, further control bits $t_4$, $t_5$, $t_6$, $t_7$, for example, which can all additionally be masked can also be provided for the control bits $t_0$, $t_1$, $t_2$, $t_3$. The processing is then provided, for example, by:

p=a;q=b
a=XOR3(c, MAJ(p, q, to), $t_4$)
b=XOR3(d, MAJ(q, c, $t_1$), $t_5$)
c=XOR3(p, MAJ(a, b, $t_2$), $t_6$)
d=XOR3(q, MAJ(b, c, $t_3$), $t_7$)

where XO is an Exclusive-OR having two inputs (in each case 1 bit). For this 4-bit S-box Y=S(X,t), not(Y)=S(not(X), not(t)) applies.

A 1-bit masking is provided in this way. It can be implemented without additional hardware costs compared with a 1-bit masking of an unparameterized S-box.

In this example, all 256 possibilities for $t_0$ to $t_7$ result in a cryptographically strong S-box.

Figure 14:
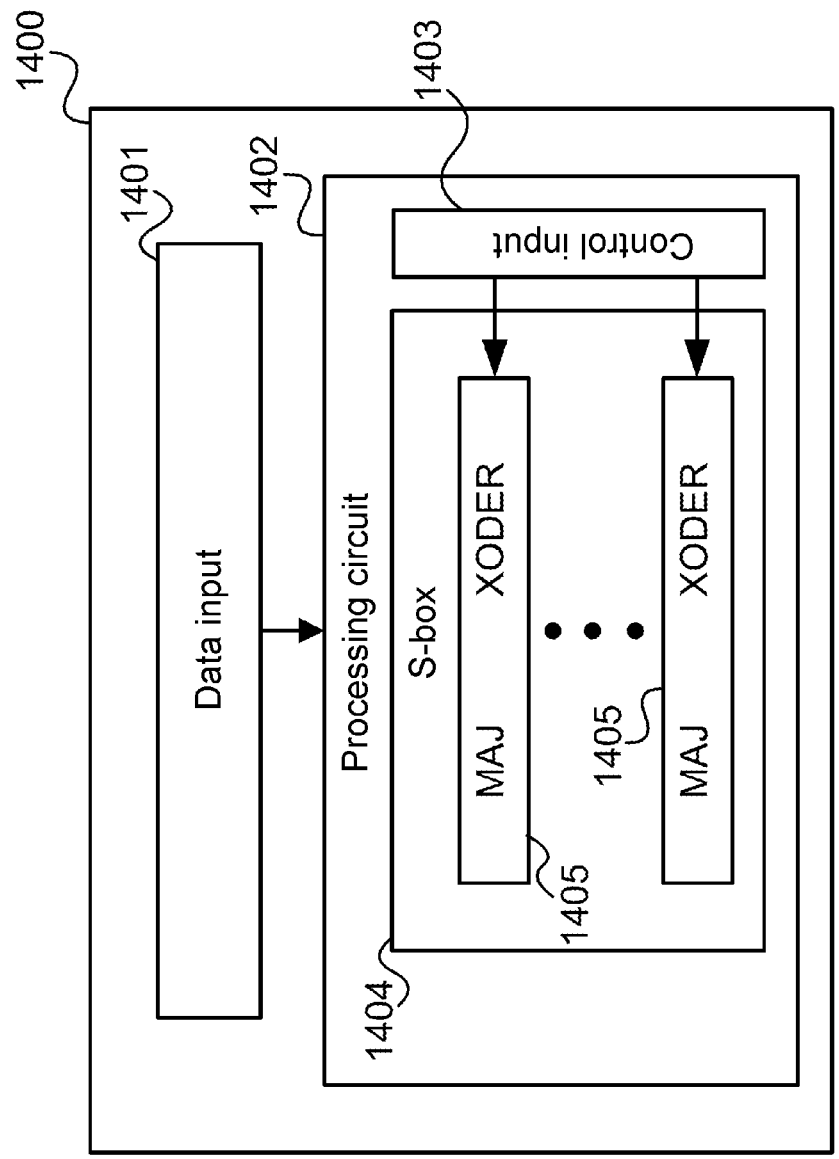
FIG. 14 shows a data processing device according to one embodiment.

To summarize, a data processing device as shown in FIG. 14 is provided according to different embodiments.

FIG. 14 shows a data processing device 1400 according to one embodiment.

The data processing device 1400 has a data input 1401 to receive a data block to be cryptographically processed.

The data processing device 1400 further has a processing circuit 1402 which has a control input to receive a set of control parameter bit values depending on which the data block is to be processed.

The processing circuit 1402 is configured to process the data block cryptographically iteratively, starting from the received version of the data block, via a plurality of processed versions of the data block through to an output version of the data block in a plurality of successive rounds, where the processing circuit implements at least one S-box 1404 and, in each round, processes data words of the version of the data block that are to be processed in the round by means of the S-box 1404.

The S-box 1404 has a plurality of successive layers 1405. Each layer has a majority gate having at least two inputs which in each case are inverting or non-inverting, said majority gate combining at least one bit of the data word to be processed by the S-box 1404 and/or at least one output bit of a preceding layer of the S-box 1404 with at least one of the control parameter bit values. Each layer 1405 further has an Exclusive-OR gate having at least two inputs which in each case are inverting or non-inverting, said Exclusive-OR gate combining the output bit of the majority gate of the layer 1405 with a bit of the data word to be processed by the S-box 1404 for or with an output bit of a preceding layer 1405 of the S-box 1404.

The data word processed by the S-box 1404 results from output bits of the layers.

In other words, a cryptographic processing is implemented according to different embodiments by means of one (or more) parameterized S-boxes. An efficient implementation is achieved as a result of the S-box consisting of a plurality of layers, each having a majority gate followed by an Exclusive-OR gate (XOR gate), wherein one or more inputs of the majority gate and/or the Exclusive-OR gate can be inverting, wherein one of a plurality of control parameter bits is fed at least to the majority gate, said control parameter bits defining the mapping which is implemented by the S-box.

The data block can be one data block of a plurality of data blocks to be cryptographically processed. The data input (e.g., a data interface) can also subdivide incoming data into data blocks.

The plurality of successive layers can form a non-linear part of the S-box and the S-box can have linear layers in addition to the non-linear part which, however, according to one embodiment, implement only the identity (i.e. the S-box has only trivial linear layers around the non-linear part).

The data processing device can have a processing control circuit which selects the set of control parameter bit values from a quantity of control parameter bit value sets and feeds it to the control input. The quantity of control parameter bit value sets can have all possible combinations of control parameter bits or only a part thereof. The quantity of control parameter bit value sets can be stored in a memory.

The S-box can be designed in such a way that, for at least one pair of different sets of control parameter bit values from the quantity of control parameter bit value sets, it implements a pair of S-boxes that are not affine equivalent.

However, the implemented S-boxes can also be affine equivalent for all control parameter bit value sets of the quantity of control parameter bit value sets.

According to one embodiment, the implemented S-boxes are cryptographically strong for all control parameter bit value sets of the quantity of control parameter bit value sets. This means that, for each implemented S-box, all output bits of the S-box have an algebraic degree greater than or equal to two in the input bits and the maximum differential probability and bias of the S-box is ¼.

The components of the data processing device can be implemented by means of one or more circuits. In one embodiment, a "circuit" is to be understood to mean any unit which implements a logic and which can be either hardware, software, firmware or a combination thereof. In one embodiment, a "circuit" can therefore be a hardwired logic circuit or a programmable logic circuit such as, for example, a programmable processor, e.g. a microprocessor (e.g. a CISC (Complex Instruction Set Computer) processor or a RISC (Reduced Instruction Set Computer) processor). A "circuit" can also be understood to mean a processor that executes software, e.g., any type of computer program, such as a computer program in programming code for a virtual machine, such as a Java computer program. In one embodiment, a "circuit" can be understood to mean any type of implementation of the functions described below.

According to one embodiment, the majority gates and the Exclusive-OR gates are hardware gates, i.e. hardwired hardware circuits, e.g., consisting of correspondingly interconnected field effect transistors, e.g. in CMOS (Complementary Metal Oxide Semiconductor) technology.

Figure 15:
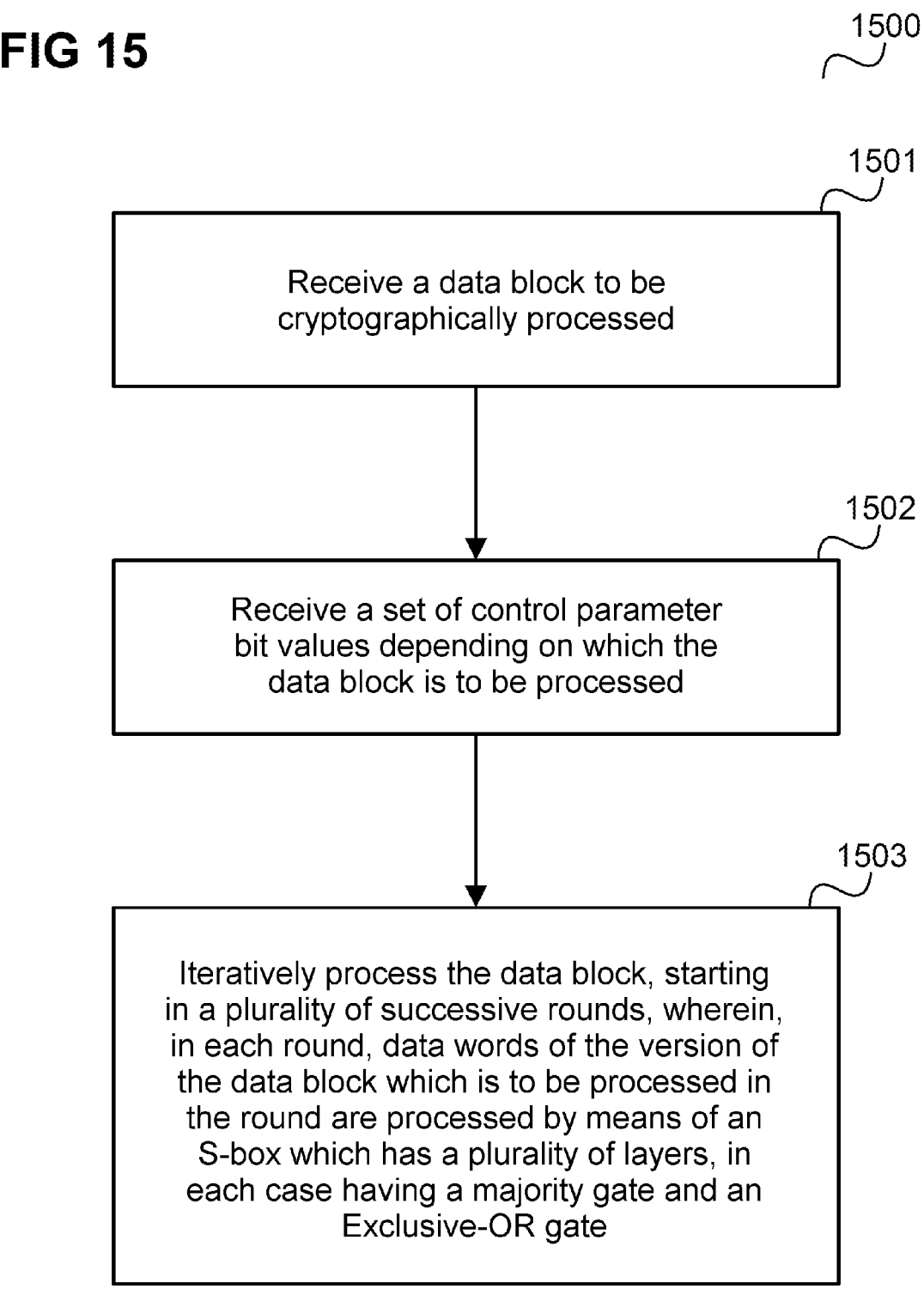
FIG. 15 shows a flow diagram which illustrates a method for the cryptographic processing of data.

According to different embodiments, a method is carried out as shown in FIG. 15.

FIG. 15 shows a flow diagram 1500 that illustrates a method for the cryptographic processing of data.

In 1501, a data block to be cryptographically processed is received.

In 1502, a set of control parameter bit values is received, depending on which the data block is to be processed.

In 1503, the data block is iteratively processed, starting from the received version of the data block, via a plurality of processed versions of the data block through to an output version of the data block in a plurality of successive rounds.

In each round, data words of the version of the data block which is to be processed in the round are processed at least by means of an S-box, wherein the S-box implements a plurality of successive layers, wherein each layer implements:
 a majority gate having at least two inputs which in each case are inverting or non-inverting, said majority gate combining at least one bit of the data word to be processed by the S-box and/or at least one output bit of a preceding layer of the S-box with at least one of the control parameter bit values; and
 an Exclusive-OR gate having at least two inputs which in each case are inverting or non-inverting, said Exclusive-OR gate combining the output bit of the majority gate of the layer with a bit of the data word to be processed by the S-box or with an output bit of a preceding layer of the S-box.

The data word processed by the S-box results from output bits of the layers (for example the output bits of the last layer, wherein each layer does not necessarily process all bits, i.e. one or more output bits can be equal to the output bits of one or more preceding layers).

Different example embodiments are indicated below.

Example embodiment 1 is a data processing device as described with reference to FIG. 14.

Example embodiment 2 is a data processing device according to example embodiment 1, wherein the majority gate combines:
- one bit of the data word to be processed by the S-box and one output bit of a preceding layer of the S-box and one of the control parameter bit values, or
- two bits of the data word to be processed by the S-box and one of the control parameter bit values, or
- two output bits of one or more preceding layers and one of the control parameter bit values.

Example embodiment 3 is a data processing device according to example embodiment 1 or 2, wherein the S-box is designed in such a way that, for at least one pair of different sets of control parameter bit values, it implements a pair of S-boxes which are not affine equivalent.

Example embodiment 4 is a data processing device according to one of example embodiments 1 to 3, wherein the data processing device has a memory which stores the set of input parameter bit values and/or has a circuit which feeds the set of input parameter bit values to the control input.

Example embodiment 5 is a data processing device according to one of example embodiments 1 to 4, wherein the Exclusive-OR gate has at least three inputs which in each case are inverting or non-inverting, and combines:
- the output bit of the majority gate of the layer
- with one bit of the data word to be processed by the S-box or one output bit of a preceding layer of the S-box, and:
- at least one of the control parameter bit values and/or at least one masking bit of a mask which is fed to the S-box.

Example embodiment 6 is a data processing device according to one of example embodiments 1 to 5, having a processing control circuit which selects the set of control parameter bit values from a quantity of control parameter bit value sets and feeds it to the control input.

Example embodiment 7 is a data processing device according to example embodiment 6, wherein the implemented S-boxes are cryptographically strong for all control parameter bit value sets of the quantity of control parameter bit value sets.

Example embodiment 8 is a method for the cryptographic processing of data as described with reference to FIG. 15.

Example embodiment 9 is a method according to example embodiment 8, wherein the majority gate combines:
- one bit of the data word to be processed by the S-box and one output bit of a preceding layer of the S-box and one of the control parameter bit values, or
- two bits of the data word to be processed by the S-box and one of the control parameter bit values, or
- two output bits of one or more preceding layers and one of the control parameter bit values.

Example embodiment 10 is a method according to example embodiment 8 or 9, wherein the S-box is designed in such a way that, for at least one pair of different sets of control parameter bit values, it implements a pair of S-boxes which are not affine equivalent.

Example embodiment 11 is a method according to one of example embodiments 8 to 10, comprising providing the set of input parameter bit values by means of a memory or by means of a circuit.

Example embodiment 12 is a method according to one of example embodiments 8 to 11, wherein the Exclusive-OR gate has at least three inputs which in each case are inverting or non-inverting, and combines:
- the output bit of the majority gate of the layer
- with one bit of the data word to be processed by the S-box or one output bit of a preceding layer of the S-box, and
- at least one of the control parameter bit values and/or at least one masking bit of a mask which is fed to the S-box.

Example embodiment 13 is a method according to one of example embodiments 1 to 12, comprising selecting the set of control parameter bit values from a quantity of control parameter bit value sets.

Example embodiment 14 is a method according to example embodiment 13, wherein the S-box is cryptographically strong for all control parameter bit value sets of the quantity of control parameter bit value sets.

According to a further example embodiment, a data processing device is provided, having means for receiving a data block to be cryptographically processed, means for receiving a set of control parameter bit values depending on which the data block is to be processed, means for the iterative processing of the data block, starting from the received version of the data block, via a plurality of processed versions of the data block through to an output version of the data block in a plurality of successive rounds, wherein data words of the version of the data block which is to be processed in the round are processed in each round by means of an S-box, wherein the S-box implements a plurality of successive layers, wherein each layer implements:
- a majority gate having at least two inputs which in each case are inverting or non-inverting, said majority gate combining at least one bit of the data word to be processed by the S-box and/or at least one output bit of a preceding layer of the S-box with at least one of the control parameter bit values;
- an Exclusive-OR gate having at least two inputs which in each case are inverting or non-inverting, said Exclusive-OR gate combining the output bit of the majority gate of the layer with a bit of the data word to be processed by the S-box or with an output bit of a preceding layer of the S-box;

wherein the data word processed by the S-box results from output bits of the layers.

Although the invention has been shown and described above all with reference to specific embodiments, it should be understood by those persons who are familiar with the technical field that numerous modifications can be made in respect of the design and details without deviating from the essence and scope of the invention as defined by the following claims. The scope of the invention is therefore defined by the attached claims, and it is intended that all modifications which fall within the meaning or equivalence range of the claims are encompassed.

What is claimed is:
1. A data processing device, comprising:
a data input for receiving a data block to be cryptographically processed;
a processing circuit comprising a control input to receive a set of control parameter bit values depending on which the data block is to be processed, wherein the processing circuit is configured to process the data block cryptographically iteratively, starting from a received version of the data block, via a plurality of processed versions of the data block, to an output version of the data block, in a plurality of successive rounds, wherein the processing circuit implements an

S-box and, in each round, processes its of the version of the data block which is to be processed in the round by means of the S-box, and wherein the S-box comprises a plurality of successive layers, wherein each layer comprises:
a majority gate having at least two inputs which are each inverting or non-inverting, said majority gate configured to combine at least one bit of the version of the data block which is to be processed by the S-box and/or at least one output bit of a preceding layer of the S-box with at least one of the control parameter bit values, wherein the majority gate is a hardwired hardware circuit or a reconfigurable hardware circuit configured to implement the majority gate; and
an Exclusive-OR gate having at least two inputs which are each inverting or non-inverting, said Exclusive-OR gate configured to combine the output bit of the majority gate of the layer with a bit of the version of the data block which is to be processed by the S-box or with an output bit of a preceding layer of the S-box, wherein the Exclusive-OR gate is a hardwired hardware circuit or a reconfigurable hardware circuit configured to implement the Exclusive-OR gate;
wherein output bits produced by the S-box result from output bits of the layers of the S-box.

2. The data processing device of claim 1, wherein the majority gate is configured to combine:
one bit of the version of the data block which is to be processed by the S-box and one output bit of a preceding layer of the S-box and one of the control parameter bit values, or
two bits of the version of the data block which is to be processed by the S-box and one of the control parameter bit values, or
two output bits of one or more preceding layers and one of the control parameter bit values.

3. The data processing device of claim 1, wherein the S-box is configured in such a way that, for at least one pair of different sets of control parameter bit values, it implements a pair of S-boxes that are not affine equivalent.

4. The data processing device of claim 1, wherein the data processing device has a memory configured to store the set of input parameter bit values and/or has a circuit configured to feed the set of input parameter bit values to the control input.

5. The data processing device of claim 1, wherein the Exclusive-OR gate has at least three inputs which in each case are inverting or non-inverting, and is configured to combine:
the output bit of the majority gate with one bit of the version of the data block which is to be processed by the S-box or one output bit of a preceding layer of the S-box, and
at least one of the control parameter bit values and/or at least one masking bit of a mask which is fed to the S-box.

6. The data processing device of claim 1, comprising a processing control circuit configured to select the set of control parameter bit values from a quantity of control parameter bit value sets and feed the selected set of control parameter bit values to the control input.

7. The data processing device of claim 6, wherein the implemented S-boxes are cryptographically strong for all control parameter bit value sets of the quantity of control parameter bit value sets.

8. A method for the cryptographic processing of data, the method comprising:
receiving a data block to be cryptographically processed;
receiving a set of control parameter bit values depending on which the data block is to be processed;
iteratively processing the data block, starting from a received version of the data block, via a plurality of processed versions of the data block, to an output version of the data block, in a plurality of successive rounds, wherein, in each round, its of the version of the data block which is to be processed in the round are processed at least by means of one S-box, wherein the S-box implements a plurality of successive layers, wherein each layer implements:
a majority gate having at least two inputs which are each inverting or non-inverting, said majority gate combining at least one bit of the version of the data block which is to be processed by the S-box and/or at least one output bit of a preceding layer of the S-box with at least one of the control parameter bit value, wherein the majority gate is a hardwired hardware circuit or a reconfigurable hardware circuit configured to implement the majority gate; and
an Exclusive-OR gate having at least two inputs which are each inverting or non-inverting, said Exclusive-OR gate combining the output bit of the majority gate of the layer with bit of the version of the data block which is to be processed by the S-box or with an output bit of a preceding layer of the S-box, wherein the Exclusive-OR gate is a hardwired hardware circuit or a reconfigurable hardware circuit configured to implement the Exclusive-OR gate;
wherein output bits produced by the S-box result from output bits of the layers of the S-box.

* * * * *

UNITED STATES PATENT AND TRADEMARK OFFICE
CERTIFICATE OF CORRECTION

PATENT NO. : 12,316,743 B2
APPLICATION NO. : 17/351821
DATED : May 27, 2025
INVENTOR(S) : F. Mendel Page 1 of 1

It is certified that error appears in the above-identified patent and that said Letters Patent is hereby corrected as shown below:

In the Claims

Column 11, Line 1 (Claim 1) please change "processes its" to -- processes bits --

Column 12, Line 25 (Claim 8) please change "its of the" to -- bits of the --

Signed and Sealed this
Fifth Day of August, 2025

Coke Morgan Stewart
*Acting Director of the United States Patent and Trademark Office*